United States Patent
Yang et al.

(10) Patent No.: US 10,476,928 B2
(45) Date of Patent: Nov. 12, 2019

(54) NETWORK VIDEO PLAYBACK METHOD AND APPARATUS

(71) Applicant: Huawei Technologies Co., Ltd., Shenzhen (CN)

(72) Inventors: Xiaofeng Yang, Shenzhen (CN); Renzhou Zhang, Nanjing (CN); Teng Shi, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 262 days.

(21) Appl. No.: 15/343,749

(22) Filed: Nov. 4, 2016

(65) Prior Publication Data

US 2017/0078354 A1 Mar. 16, 2017

Related U.S. Application Data

(63) Continuation of application No. PCT/CN2015/077895, filed on Apr. 30, 2015.

(30) Foreign Application Priority Data

May 5, 2014 (CN) .......................... 2014 1 0186163

(51) Int. Cl.
*G06F 15/16* (2006.01)
*H04L 29/06* (2006.01)
*H04L 29/08* (2006.01)

(52) U.S. Cl.
CPC ........ *H04L 65/604* (2013.01); *H04L 65/4069* (2013.01); *H04L 67/02* (2013.01)

(58) Field of Classification Search
CPC ............. H04L 65/604; H04L 65/4069; H04N 21/21339; H04N 21/26258; H04N 21/8455; H04N 21/8456

(Continued)

(56) References Cited

U.S. PATENT DOCUMENTS

RE40,080 E  *  2/2008  Tan .......................... 378/204.15
8,315,307 B2 * 11/2012  Chen ...................... H04N 19/51
                                              375/240.12

(Continued)

FOREIGN PATENT DOCUMENTS

CN  101090492 A  12/2007
CN  101106637 A   1/2008

(Continued)

OTHER PUBLICATIONS

"Information technology—Dynamic adaptive streaming over HTTP (DASH)—Part 3: Implementation guidelines," ISO/IEC JTC1/SC 29 N, ISO/IEC DTR 23009-3, Aug. 1, 2013, 22 pages (Year: 2013).*

(Continued)

*Primary Examiner* — Liang Che A Wang
*Assistant Examiner* — Kaylee J Huang
(74) *Attorney, Agent, or Firm* — Conley Rose, P.C.

(57) ABSTRACT

A network video playback method and an apparatus, where location information of an independently decoded frame in a media segment and location information of a non-independently decoded frame that is in the media segment and that references the independently decoded frame are added to a segment index in order to determine a video frame closest to an access time point from the independently decoded frame and the non-independently decoded frame. The independently decoded frame that is referenced by the video frame closest to the access time point is acquired when the video frame closest to the access time point is the non-independently decoded frame, and decoding starts from the video frame closest to the access time point according to the referenced independently decoded frame, and video playback is performed. Hence, access accuracy of network video playback can be improved.

18 Claims, 8 Drawing Sheets

(58) Field of Classification Search
USPC .............. 709/219, 203, 231, 232, 236, 247
See application file for complete search history.

(56) References Cited

U.S. PATENT DOCUMENTS

| | | | | |
|---|---|---|---|---|
| 8,566,860 | B2* | 10/2013 | Ku ................... | H04N 21/4532 725/28 |
| 2004/0231004 | A1* | 11/2004 | Seo ................... | H04N 7/17318 725/142 |
| 2006/0171666 | A1 | 8/2006 | Im et al. | |
| 2006/0222076 | A1* | 10/2006 | Ludvig ............. | H04N 7/17336 375/240.16 |
| 2011/0099594 | A1 | 4/2011 | Chen et al. | |
| 2011/0317760 | A1* | 12/2011 | Chen ................ | G11B 27/007 375/240.12 |
| 2013/0107953 | A1 | 5/2013 | Chen et al. | |
| 2013/0114735 | A1 | 5/2013 | Wang | |

FOREIGN PATENT DOCUMENTS

| | | |
|---|---|---|
| CN | 102123281 A | 7/2011 |
| CN | 102136948 A | 7/2011 |
| CN | 102144390 A | 8/2011 |
| CN | 102232298 A | 11/2011 |
| CN | 102467940 A | 5/2012 |
| CN | 102761773 A | 10/2012 |
| CN | 103957471 A | 7/2014 |
| EP | 2615790 A1 | 7/2013 |
| JP | 2013205680 A | 10/2013 |
| JP | 2014535219 A | 12/2014 |
| JP | 2014535223 A | 12/2014 |
| WO | 2012003237 A1 | 1/2012 |

OTHER PUBLICATIONS

Machine Translation and Abstract of Chinese Publication No. CN102136948, dated Jul. 27, 2011, 27 pages.
Machine Translation and Abstract of Chinese Publication No. CN103957471, dated Jul. 30, 2014, 9 pages.
"Series H: Audiovisual and Multimedia Systems, Infrastructure of audiovisual services—Coding of moving video, Advanced video coding for generic audiovisual services," ITU-T, H.264, Feb. 2014, 790 pages.
"Series H: Audiovisual and Multimedia Systems, Infrastructure of audiovisual services—Coding of moving video, High efficiency video coding," ITU-T, H.265, Apr. 2013, 317 pages.
Yu, L., et al., "Overview of AVS-video coding standards," Signal Processing: Image Communication, Feb. 4, 2009, pp. 247-262.
"Information technology—Dynamic adaptive streaming over HTTP (DASH)—Part 1: Media presentation description and segment formats," ISO/IEC 23009-1:2012(E), Jan. 5, 2012, 133 pages.
"Information technology—Coding of audio-visual objects—Part 12: ISO base media tile format," ISO/IEC 14496-12, 2012, 190 pages.
"Information technology—Dynamic adaptive streaming over HTTP (DASH)—Part 3: Implementation guidelines," ISO/IEC PDTR 23009-3, Apr. 14, 2014, 52 pages.
Jang, E., et al., "Virtual Segmentation of TS Packetized Video using Key-frame Information," ISO/IEC JTC1/SC29/WG11, MPEG2010/ M18415, Oct. 2010, 4 pages.
Foreign Communication From A Counterpart Application, European Application No. 15789417.1, Extended European Search Report dated Feb. 23, 2017, 11 pages.
Foreign Communication From A Counterpart Application, Chinese Application No. 201410186163.3, Chinese Search Report dated Aug. 8, 2016, 2 pages.
Foreign Communication From A Counterpart Application, Chinese Application No. 201410186163.3, Chinese Office Action dated Aug. 22, 2016, 5 pages.
Foreign Communication From A Counterpart Application, PCT Application No. PCT/CN2015/077895, English Translation of International Search Report dated Jul. 30, 2015, 2 pages.
Foreign Communication From A Counterpart Application, PCT Application No. PCT/CN2015/077895, English Translation of Written Opinion dated Jul. 30, 2015, 6 pages.
"Information technology—Dynamic adaptive streaming over HTTP (DASH)—Part 3: Implementation guidelines," ISO/IEC JTC/SC 29 N, ISO/IEC DTR 23009-3, Aug. 1, 2013, 22 pages.
Foreign Communication From A Counterpart Application, Chinese Application No. 2016-566765, Chinese Office Action dated Nov. 14, 2017, 12 pages.
Foreign Communication From A Counterpart Application, Chinese Application No. 2016-566765, English Translation of Chinese Office Action dated Nov. 14, 2017, 12 pages.
Machine Translation and Abstract of Japanese Publication No. JP2013205680, dated Oct. 7, 2013, 19 pages.
Foreign Communication From A Counterpart Application, Japanese Application No. 2016-566765, Japanese Notice of Allowance dated Mar. 13, 2018, 3 pages.
"Information technology—Dynamic adaptive streaming over HTTP (DASH)—Part 3: Implementation guidelines," ISO/IEC DTR 23009-3, Aug. 1, 2013, 22 pages.
Qualcomm Incorporated,"Use Cases and Examples for Adaptive HTTP Streaming," 3GPP TSG-SA4 #58, S4-100408, Jun. 21-24, 2010, 22 pages.
Foreign Communication From A Counterpart Application, Japanese Application No. 2016-566765, Japanese Office Action dated Nov. 14, 2017, 12 pages.
Foreign Communication From A Counterpart Application, Japanese Application No. 2016-566765, English Translation of Japanese Office Action dated Nov. 14, 2017, 12 pages.

* cited by examiner

NETWORK VIDEO PLAYBACK METHOD AND APPARATUS

CROSS-REFERENCE TO RELATED APPLICATIONS

This application is a continuation of International Application No. PCT/CN2015/077895, filed on Apr. 30, 2015, which claims priority to Chinese Patent Application No. 201410186163.3, filed on May 5, 2014. The disclosures of the aforementioned applications are hereby incorporated by reference in their entireties.

TECHNICAL FIELD

The present disclosure relates to the field of communications network technologies, and in particular, to a network video playback method and an apparatus.

BACKGROUND

Perceptual coding is a new coding technology. A background-modeling-based coding technology is a representative of the perceptual coding, and is mainly applied to scenarios with nearly unchanged backgrounds, such as video surveillance, conference calls, and newscasts. In addition to using a background modeling method to effectively reduce a scenario redundancy in a background, the background-modeling-based coding technology uses a new Group of pictures (GOP) structure, and therefore can significantly increase an encoding compression rate based on a general coding technology.

GOP is a basic structure of a coded video stream, and is also a smallest unit that can be independently decoded in a video sequence. A conventional GOP includes one independently decoded frame and multiple non-independently decoded frames, and a quantity of video frames included in a GOP is called a length of the GOP. To improve a compression rate, the length of a GOP can be properly increased, but an excessively long length of a GOP causes a defect of deterioration in an error diffusion effect. The background-modeling-based coding technology improves a GOP structure. In an improved GOP structure, an independently decoded frame is a background frame (G frame), and non-independently decoded frames include a background update frame (S frame), a forward-predicted frame (P frame), and a bi-directional predicted frame (B frame). An S frame can reference only one G frame closest to the S frame, a P frame can reference a G frame that is before the P frame or reference an S frame that is close to the P frame, and a B frame can also reference a G frame that is before the B frame or reference an S frame that is close to the B frame. This improved GOP structure can suppress the error diffusion effect such that a quite long length of GOP can be used in the background-modeling-based coding technology to further improve coding efficiency.

Dynamic Adaptive Streaming over Hypertext Transfer Protocol (HTTP) (DASH) technology uses an HTTP manner to transfer media content to a user, and has become a development trend in the network video industry currently. A key to the technology is sequentially segmenting media content on a server into media segments, where time lengths of the media segments are the same, generally being two to ten seconds, and every media segment is corresponding to one HTTP network address such that a client can acquire the media segment from the address. A server provides a Media Presentation Description (MPD) file, which is used to record an HTTP manner of acquiring these media segments, and information about the playback period of the media segments. A media segment may be further divided into subsegments, and every subsegment includes several video frames. In DASH, a segment index (sidx) is defined to indicate a start location, in a media segment, of each subsegment in the media segment, where the sidx further includes playback duration of each subsegment, and location information of the first Stream Access Point (SAP) in each subsegment.

An existing DASH access procedure includes that a terminal first acquires an MPD file, determines, according to an access time point input by a user and the MPD file, a segment corresponding to the access time point, determines, according to a segment index sidx of the segment, a subsegment corresponding to the access time point and a location of the first SAP of the subsegment, starts decoding from a video frame corresponding to the first SAP, and then performs playback.

A GOP is quite long, and only one SAP is defined for the current GOP when a coded video stream based on background modeling coding is being transmitted using DASH, which means that an independently decoded frame in the GOP is defined as the SAP. Therefore, there may be a quite large difference between an access time point input by a user and a SAP at which actual access is performed. As a result, access accuracy is poor, and user access experience is affected.

SUMMARY

Embodiments of the present disclosure provide a network video playback method and an apparatus, which can resolve a prior-art problem that access accuracy is poor when a video stream based on background modeling coding is being transmitted in a DASH manner.

According to a first aspect, an embodiment of the present disclosure provides a network video playback terminal, including a transceiver unit, a processing unit, and a playback unit, where the transceiver unit is configured to receive an MPD file of a video, and acquire an access time point requested by a user. The processing unit is configured to determine, according to the MPD file, a media segment corresponding to the access time point. The transceiver unit is further configured to acquire a segment index of the media segment determined by the processing unit, where the segment index includes location information of an independently decoded frame in the media segment and location information of a non-independently decoded frame that is in the media segment and that references an independently decoded frame. The processing unit is further configured to determine, according to the location information of the independently decoded frame in the media segment and location information of a non-independently decoded frame that is in the media segment and that references an independently decoded frame, a video frame closest to the access time point from the independently decoded frame and the non-independently decoded frame that references the independently decoded frame, and determine that the video frame closest to the access time point is a non-independently decoded frame. The transceiver unit is further configured to acquire an independently decoded frame that is referenced by the video frame closest to the access time point after the processing unit determines that the video frame closest to the access time point is a non-independently decoded frame, and the playback unit is configured to start decoding from the video frame closest to the access time point according to the independently decoded frame that is referenced by the video frame closest to the access time point, and perform video playback.

In a first possible implementation manner of the first aspect, the processing unit is further configured to determine that the video frame closest to the access time point is an independently decoded frame, and the playback unit is further configured to start decoding from the video frame closest to the access time point, and perform video playback after the processing unit determines that the video frame closest to the access time point is an independently decoded frame.

With reference to the first aspect or the first possible implementation manner of the first aspect, in a second possible implementation manner, the segment index includes a description of a subsegment in the media segment, and that the transceiver unit acquires a segment index of the media segment, where the segment index includes location information of an independently decoded frame in the media segment and location information of a non-independently decoded frame that is in the media segment and that references an independently decoded frame further includes acquiring the segment index of the media segment, where the description of the subsegment in the media segment includes location information of an independently decoded frame in the subsegment and location information of a non-independently decoded frame that is in the subsegment and that references an independently decoded frame.

With reference to the first aspect or the first possible implementation manner of the first aspect or the second possible implementation manner of the first aspect, in a third possible implementation manner, the MPD file or the segment index further includes a frame identifier of the independently decoded frame that is referenced by the non-independently decoded frame, and that the transceiver unit acquires an independently decoded frame that is referenced by the video frame closest to the access time point further includes acquiring, according to the frame identifier of the independently decoded frame, the independently decoded frame that is referenced by the video frame closest to the access time point.

With reference to the third possible implementation manner of the first aspect, in a fourth possible implementation manner, the frame identifier of the independently decoded frame includes a segment identifier of the segment in which the independently decoded frame is located and location information of the independently decoded frame in the segment, and that the transceiver unit acquires an independently decoded frame that is referenced by the video frame closest to the access time point further includes acquiring, according to the segment identifier of the segment in which the independently decoded frame is located and location information of the independently decoded frame in the segment, the independently decoded frame that is referenced by the video frame closest to the access time point.

According to a second aspect, an embodiment of the present disclosure provides a network video playback server, including a receiving unit configured to receive a request for acquiring a segment index of a media segment, where the request is sent by a terminal after the terminal determines the media segment corresponding to an access time point, and the sending unit configured to return the segment index to the terminal according to the request, where the segment index includes location information of an independently decoded frame in the media segment and location information of a non-independently decoded frame that is in the media segment and that references an independently decoded frame.

According to a third aspect, an embodiment of the present disclosure provides a network video playback method, including receiving an MPD file of a video, and acquiring an access time point requested by a user, determining, according to the MPD file, a media segment corresponding to the access time point, acquiring a segment index of the media segment, where the segment index includes location information of an independently decoded frame in the media segment and location information of a non-independently decoded frame that is in the media segment and that references the independently decoded frame, determining, according to the location information of an independently decoded frame in the media segment and location information of an non-independently decoded frame that is in the media segment and that references an independently decoded frame, a video frame closest to the access time point from the independently decoded frame and the non-independently decoded frame that references an independently decoded frame, determining that the video frame closest to the access time point is a non-independently decoded frame, and acquiring an independently decoded frame that is referenced by the video frame closest to the access time point, and starting decoding from the video frame closest to the access time point according to the independently decoded frame that is referenced by the video frame closest to the access time point, and performing video playback.

In a first possible implementation manner of the third aspect, the method further includes determining that the video frame closest to the access time point is an independently decoded frame, starting decoding from the video frame closest to the access time point, and performing video playback.

With reference to the third aspect or the first possible implementation manner of the third aspect, in a second possible implementation manner, the segment index includes a description of a subsegment in the media segment, and that the segment index includes location information of an independently decoded frame in the media segment and location information of a non-independently decoded frame that is in the media segment and that references an independently decoded frame further includes that the description of the subsegment in the media segment includes location information of an independently decoded frame in the subsegment and location information of a non-independently decoded frame that is in the subsegment and that references an independently decoded frame.

With reference to the third aspect or the first possible implementation manner of the third aspect or the second possible implementation manner of the third aspect, in a third possible implementation manner, the MPD file or the segment index further includes a frame identifier of the independently decoded frame that is referenced by the non-independently decoded frame, and the acquiring an independently decoded frame that is referenced by the video frame closest to the access time point is further includes acquiring, according to the frame identifier of the independently decoded frame, the independently decoded frame that is referenced by the video frame closest to the access time point.

With reference to the third possible implementation manner of the third aspect, in a fourth possible implementation manner, the frame identifier of the independently decoded frame includes a segment identifier of the segment in which the independently decoded frame is located and location information of the independently decoded frame in the segment.

It can be seen from the foregoing technical solutions provided in the embodiments of the present disclosure that, in the solutions, location information of an independently decoded frame in a media segment and location information of a non-independently decoded frame that is in the media segment and that references an independently decoded frame are added to a segment index in order to determine, from the independently decoded frame and the non-independently decoded frame, a video frame closest to an access time point. If the video frame closest to the access time point is a non-independently decoded frame, the independently decoded frame that is referenced by the video frame closest to the access time point is acquired, and decoding starts from the video frame closest to the access time point according to the referenced independently decoded frame, and video playback is performed. In this way, terminal access accuracy is improved.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
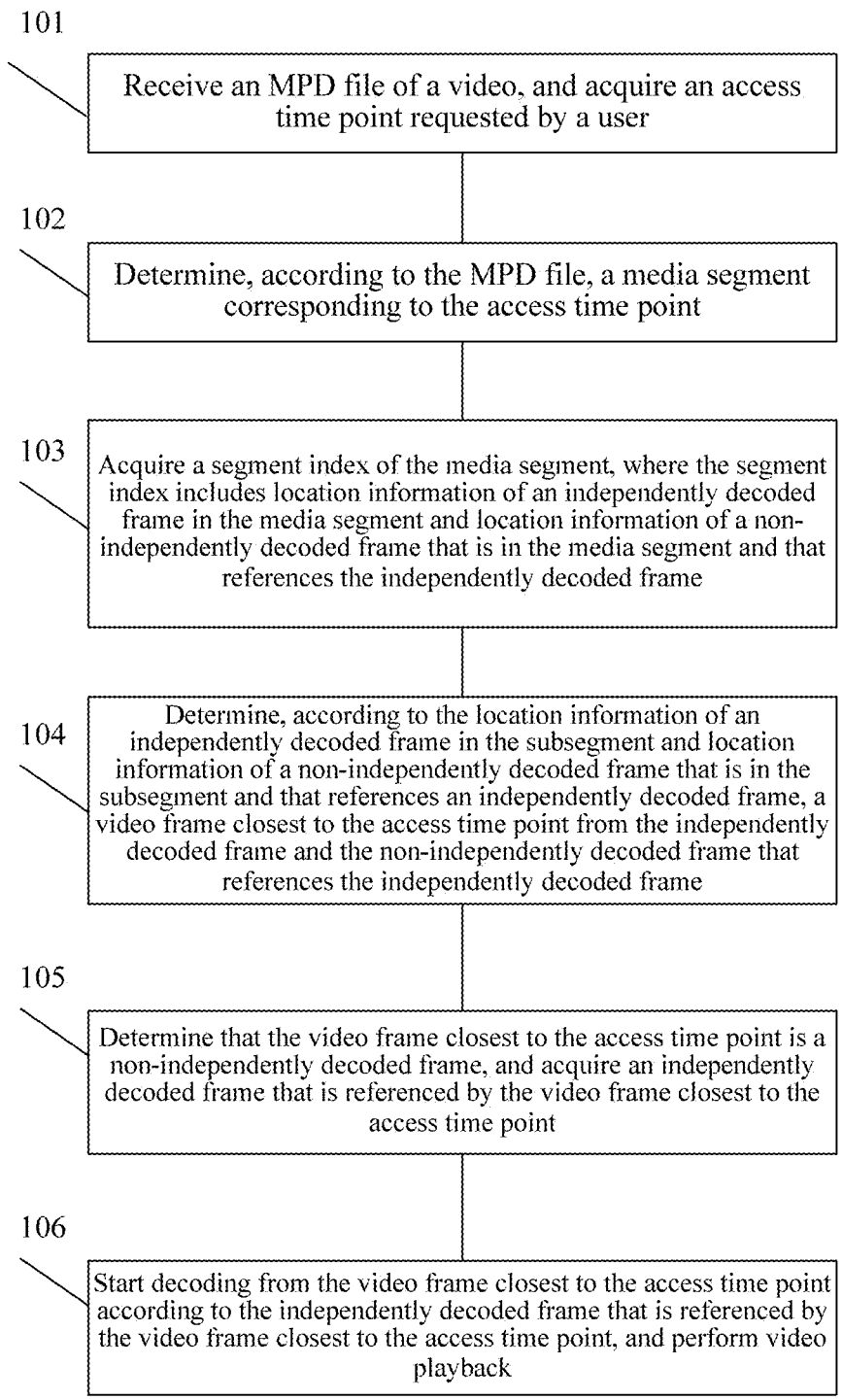
FIG. 1 is a flowchart of a network video playback method according to an embodiment of the present disclosure.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

An embodiment of the present disclosure provides a network video playback method. In the method, a terminal acquires an MPD file from a server, acquires a media segment according to the MPD file, and then performs video playback. For the method performed by the terminal, refer to FIG. 1. The method includes the following steps.

Step 101: Receive an MPD file of a video, and acquire an access time point requested by a user.

Step 102: Determine, according to the MPD file, a media segment corresponding to the access time point.

Step 103: Acquire a segment index of the media segment, where the segment index includes location information of an independently decoded frame in the media segment and location information of a non-independently decoded frame that is in the media segment and that references the independently decoded frame.

The independently decoded frame is a background frame, and the non-independently decoded frame is a background update frame or a forward-predicted frame.

The segment index includes a description of a subsegment in the media segment, and that the segment index includes location information of an independently decoded frame in the media segment and location information of a non-independently decoded frame that is in the media segment and that references the independently decoded frame may include the description of the subsegment in the media segment that includes location information of an independently decoded frame in the subsegment and location information of a non-independently decoded frame that is in the subsegment and that references an independently decoded frame.

Step 104: Determine, according to the location information of an independently decoded frame in the subsegment and location information of a non-independently decoded frame that is in the subsegment and that references an independently decoded frame, a video frame closest to the access time point from the independently decoded frame and the non-independently decoded frame that references the independently decoded frame.

Step 105: Determine that the video frame closest to the access time point is a non-independently decoded frame, and acquire an independently decoded frame that is referenced by the video frame closest to the access time point.

Step 106: Start decoding from the video frame closest to the access time point according to the independently decoded frame that is referenced by the video frame closest to the access time point, and perform video playback.

Optionally, the method further includes determining that the video frame closest to the access time point is an independently decoded frame, starting decoding from the video frame closest to the access time point, and performing video playback.

Optionally, when the segment index in step 103 further includes a frame identifier of the independently decoded frame that is referenced by the non-independently decoded frame, acquiring an independently decoded frame that is referenced by the video frame closest to the access time point in step 105 further includes acquiring, according to the frame identifier of the independently decoded frame included in the segment index, the independently decoded frame that is referenced by the video frame closest to the access time point.

Optionally, when the MPD file in step 101 includes a frame identifier of the independently decoded frame that is referenced by the non-independently decoded frame, acquiring an independently decoded frame that is referenced by the video frame closest to the access time point in step 105 further includes acquiring, according to the frame identifier of the independently decoded frame included in the MPD file, the independently decoded frame that is referenced by the video frame closest to the access time point.

The frame identifier of the independently decoded frame includes a segment identifier of the segment in which the independently decoded frame is located and location information of the independently decoded frame in the segment. Optionally, the segment in which the independently decoded frame is located is a single segment that includes only the independently decoded frame, and the MPD file includes an acquiring address of the single segment, and before determining, according to the MPD file, a media segment corresponding to the access time point, the method further includes acquiring the single segment according to the acquiring address of the single segment.

Optionally, the segment index acquired in step 103 further includes types of the independently decoded frame and the non-independently decoded frame, and determining whether the video frame closest to the access time point is an independently decoded frame or a non-independently decoded frame further includes determining, according to the types of the independently decoded frame and the non-independently decoded frame included in the segment index, whether the video frame closest to the access time point is an independently decoded frame or a non-independently decoded frame.

An embodiment of the present disclosure provides a network video playback method. In the method, a video stream based on background modeling coding is being transmitted in a DASH manner, and in a video frame corresponding to an SAP, a frame identifier of an independently decoded frame that is referenced by a non-independently decoded frame may be included in an MPD file or a segment index.

Figure 2:
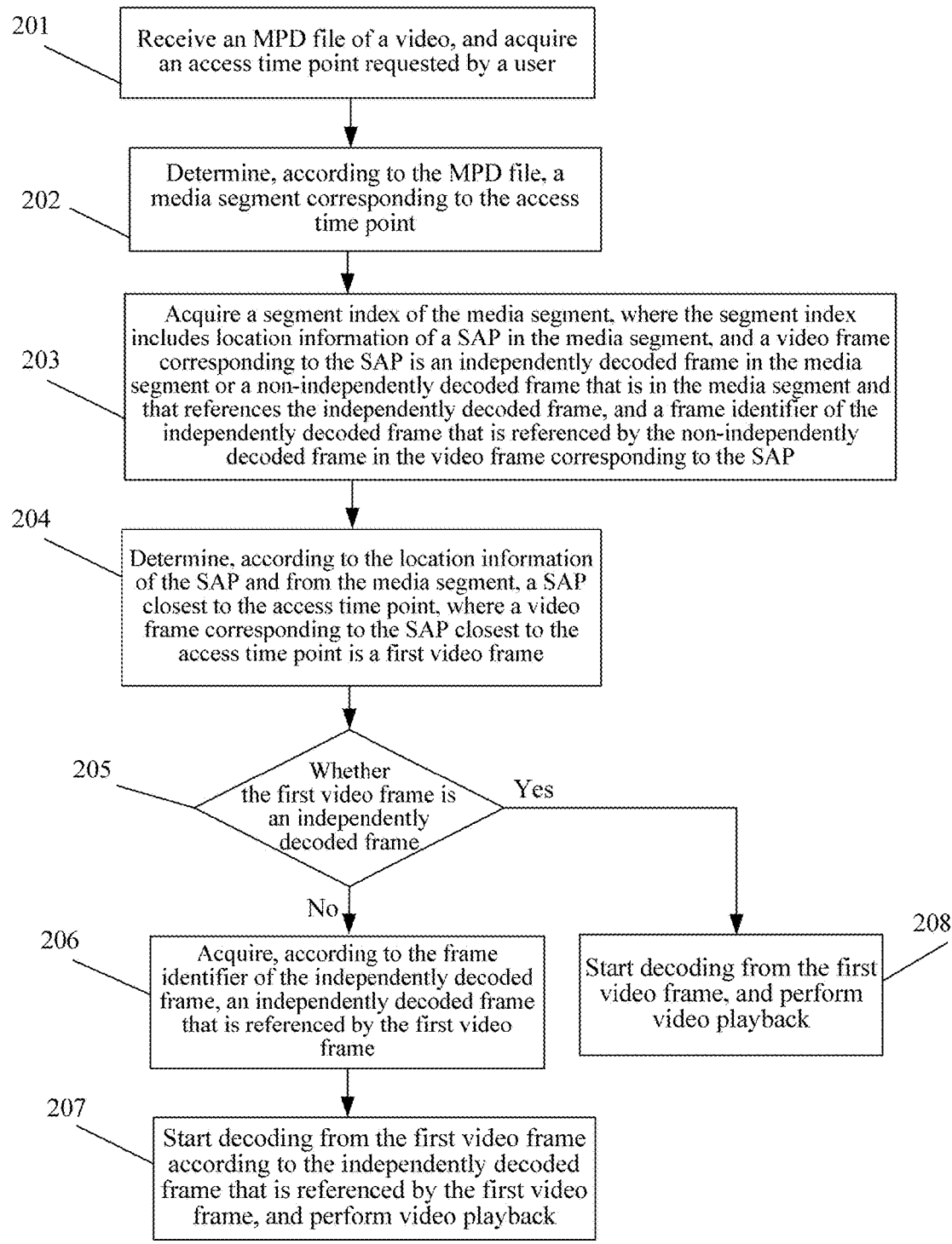
FIG. 2 is a flowchart of a network video playback method according to another embodiment of the present disclosure.

In the video frame corresponding to the SAP, when the frame identifier of the independently decoded frame that is referenced by the non-independently decoded frame is included in a segment index, refer to FIG. 2 for a detailed procedure for accessing a video stream by a terminal. The procedure includes the following steps.

Step 201: Receive an MPD file of a video, and acquire an access time point requested by a user.

Further, the step 201 may include that the terminal requests, according to a video selected by a user, an MPD file of the video from a server, receives the MPD file returned by the server, and acquires start time for watching, that is, an access time point directly input on a player interface or selected by dragging a progress bar by the user.

Further, the step 201 may further be the terminal resumes, according to selection of a user, playback of a video that the user did not finish watching last time, acquires time for resuming playback, that is, an access time point stored in a server or stored locally, requests an MPD file of the video from the server, and receives the MPD file returned by the server, or directly acquires the downloaded MPD file of the video from a local cache.

Acquiring addresses and playback duration of media segments of the video are recorded in the MPD file, where an acquiring address is composed of a base address and a segment identifier of the video, and the segment identifier is used to indicate a storage address, corresponding to the base address, of a media segment. The terminal can acquire the media segments from the server according to the acquiring addresses. For example, if the base address (BaseURL) of the video is http://www.example.com/server/Segments, and the segment identifier of a media segment is seg1.m4s, the acquiring address of the media segment is http://www.example.com/server/Segments/seg1.m4s.

Step 202: Determine, according to the MPD file, a media segment corresponding to the access time point.

Further, the step 202 may be computing, according to playback duration of media segments that is recorded in the MPD file, an acquiring address of the media segment corresponding to the access time point. For example, if playback duration of the media segments that is recorded in the MPD is all two seconds, segment identifiers included in a segment list are respectively seg0.m4s, seg1.m4s, seg2.m4s, seg3.m4s, seg4.m4s, seg5.m4s, . . . , and the access time point is the seventh second, the segment identifier of the media segment corresponding to the access time point is seg3.m4s.

Step 203: Acquire a segment index of the media segment, where the segment index includes location information of an SAP in the media segment, and a video frame corresponding to the SAP is an independently decoded frame in the media segment or a non-independently decoded frame that is in the media segment and that references the independently decoded frame, and the segment index further includes a frame identifier of the independently decoded frame that is referenced by the non-independently decoded frame in the video frame corresponding to the SAP.

There may be the following two manners for storing a segment index in the server.

Manner 1: The segment index may be located in a single index segment, and description information of the segment in the MPD includes a segment identifier of the index segment.

Manner 2: The segment index may be located in the header of a corresponding media segment.

Acquiring a segment index of the media segment includes first determining, by checking whether a segment identifier of the index segment is included in the description information of the media segment in the MPD file, the manner for storing the segment index. It is determined that the storage manner is the first storage manner if the segment identifier of the index segment is included in the description information, and the index segment is acquired according to the segment identifier, and the segment index is acquired from the index segment. Otherwise, it is determined that the storage manner is the second storage manner, and the segment index is parsed out from the header of the media segment after the media segment is acquired. For example, when the description information of the media segment is <SegmentURL media='seg1.m4s' index='seg1-index.m4s'/>, it is determined that the index segment exists and the segment identifier of the index segment is seg1-index.m4s. For another example, when the description information of the media segment is <SegmentURL media='seg1.m4s'/>, it is determined that the segment index is in the header of the media segment. A specific process of implementing the step may be the same as that in the prior art, and details are not described herein.

The segment index further includes a description of a subsegment in the media segment, and that the segment index includes location information of an SAP in the media segment may be the description of the subsegment in the media segment includes location information of each SAP in the subsegment. For example, the description of the subsegment in the media segment includes a time or location offset, relative to a start location of the subsegment, of each SAP in the subsegment.

In this embodiment, the independently decoded frame in the video frame corresponding to the SAP is a G frame, and the non-independently decoded frame in the video frame corresponding to the SAP is a P frame or an S frame, where the P frame or the S frame references a G frame that is before the P frame or the S frame, and the P frame or the S frame can be decoded after the referenced G frame is acquired.

Optionally, the segment index further includes a type of the video frame corresponding to the SAP, where the type is used to indicate whether the video frame corresponding to the SAP is an independently decoded frame or a non-independently decoded frame.

When encapsulating the media segment, the server successively encapsulates the independently decoded frame and the non-independently decoded frame of the video into the media segment, and adds location information of the SAP in the media segment to the segment index of the media segment, where location information of the SAP is location information of an independently decoded frame in the media segment and location information of a non-independently decoded frame that is in the media segment and that references an independently decoded frame. Optionally, the independently decoded frame of the video may also be encapsulated into a single segment, and an acquiring address of the single segment is included in the MPD file. For example, a description of initialization information in the MPD file includes a segment identifier of the single segment, and a base address and the segment identifier of the video compose the acquiring address of the single segment. Before the terminal determines, according to the MPD file, the media segment corresponding to the access time point, the terminal needs to acquire the single segment according to the acquiring address, and then locally store the single segment.

Figure 3:
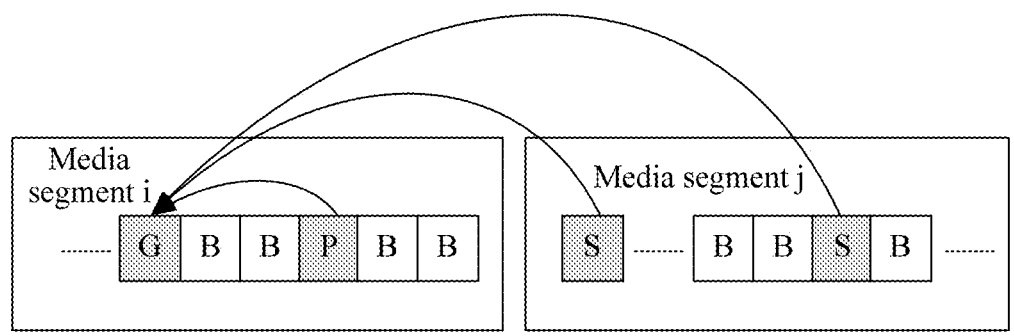
FIG. 3 is schematic structural diagram of a media segment when a single segment is not encapsulated in the embodiment corresponding to FIG. 2 of the present disclosure.

FIG. 3 is a schematic structural diagram of a media segment when a single segment is not encapsulated. A frame marked with shade is a video frame corresponding to the SAP in the media segment, for example, a G frame, a P frame, and an S frame. An arrow represents a reference relationship indicating that the non-independently decoded frame in the video frame corresponding to the SAP references the independently decoded frame in the media segment, for example, the P frame and the S frame reference the G frame. When this encapsulation manner is used, the frame identifier of the independently decoded frame included in the segment index further includes a segment identifier of the media segment in which the independently decoded frame is located and location information of the independently decoded frame in the media segment, where the location information may be a frame number, or may be a storage offset address.

Figure 4:
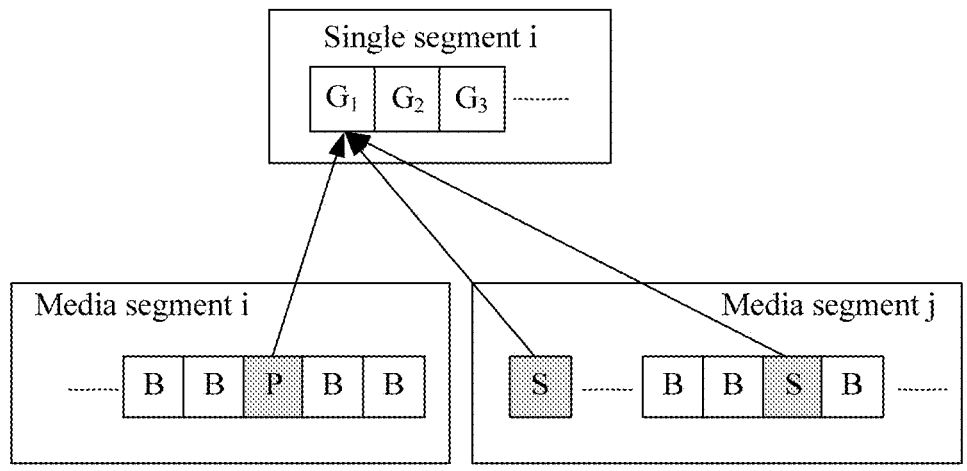
FIG. 4 is schematic structural diagram of a segment when a video frame is encapsulated into a single segment in the embodiment corresponding to FIG. 2 of the present disclosure.

FIG. 4 is a schematic structural diagram of a segment when a video frame is encapsulated into a single segment. A frame marked with shade is a video frame corresponding to the SAP in the media segment, for example, a G frame, a P frame, and an S frame. An arrow represents a reference relationship indicating that the non-independently decoded frame in the video frame corresponding to the SAP references the independently decoded frame in the single segment, for example, the P frame and the S frame reference the G frame. When this encapsulation manner is used, the frame identifier of the independently decoded frame included in the segment index includes a segment identifier of the single segment in which the independently decoded frame is located and the location information of the independently decoded frame in the single segment, where the location information may be a frame number, or may be a storage offset address.

Figure 5:
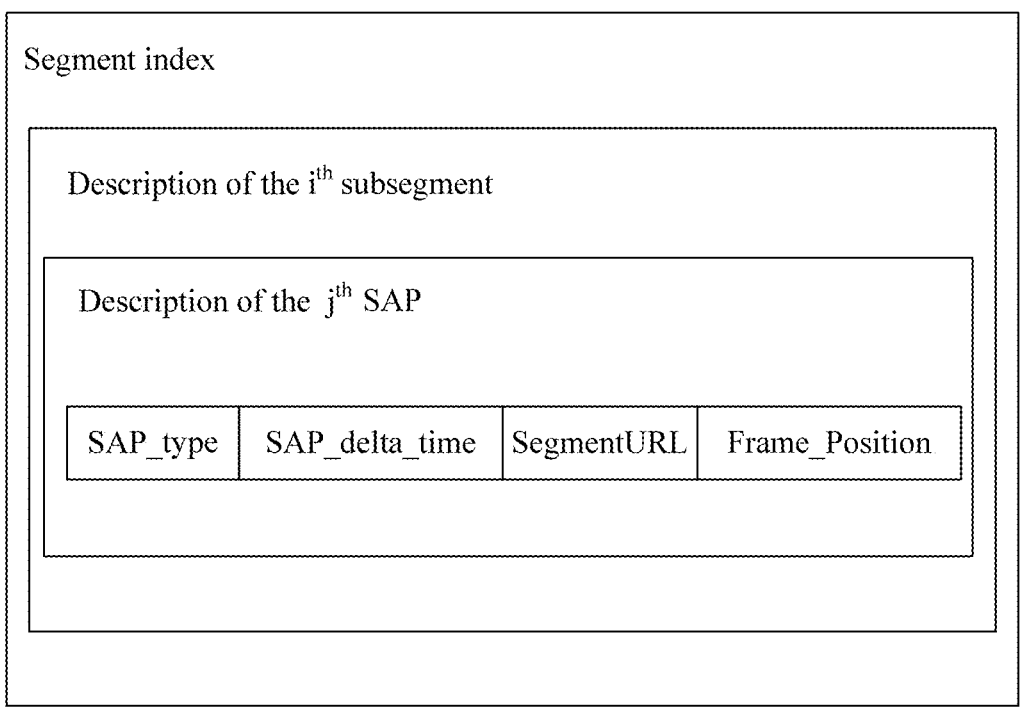
FIG. 5 shows an example of a segment index in the embodiment corresponding to FIG. 2 of the present disclosure.

FIG. 5 shows an example of a segment index in the two examples corresponding to FIG. 3 and FIG. 4. The segment index includes a description of each subsegment, where the description of any subsegment includes a description of each SAP in the subsegment, and the description of any SAP includes four parameters, SAP_type, SAP_delta_time, SegmentURL, and Frame_Position. The parameter SAP_type is used to indicate a type of a video frame corresponding to the SAP. The parameter SAP_delta_time is used to indicate a time offset, relative to a start location of the subsegment, of the SAP. The parameters SegmentURL and Frame_Position have valid values only when the parameter SAP_type indicates that the video frame corresponding to the SAP is a non-independently decoded frame. The parameter SegmentURL is used to indicate a segment identifier of a segment in which a G frame referenced by the video frame corresponding to the SAP is located. The parameter Frame_Position is used to indicate a frame number or a storage offset address of the G frame in the segment. In the example corresponding to FIG. 3, a segment in which the G frame is located refers to a media segment, and in the example corresponding to FIG. 4, a segment in which the G frame is located refers to a single segment.

In the example corresponding to FIG. 3, an existing manner of encapsulating a segment by the server does not need to be changed, and therefore, costs of changing an existing system are the lowest. In the example corresponding to FIG. 4, the server encapsulates the independently decoded frame into the single segment, and the terminal downloads the single segment to the terminal before the terminal determines, according to the MPD file, the media segment corresponding to the access time point. This can avoid a problem of a low access speed or high overheads in the first example when the P frame or the S frame in the video frame corresponding to the SAP and the G frame that is referenced by the P frame or the S frame are not in a same media segment, the media segment in which the G frame is located needs to be acquired in real time and then parsed out, or all media segments are downloaded in advance. Therefore, a speed of acquiring the G frame is increased at the cost of minimum space overheads. However, costs of changing the existing system are higher than those in the first example, because the single segment needs to be encapsulated and the MPD file needs to be modified additionally.

Step 204: Determine, according to the location information of the SAP and from the media segment, an SAP closest to the access time point, where a video frame corresponding to the SAP closest to the access time point is a first video frame.

Further, the step 204 includes first, determining, according to playback duration of each subsegment included in the segment index, the subsegment that includes the access time point, second, acquiring a time offset, relative to a start location of the subsegment, of each SAP in the subsegment included in the segment index, and computing an actual playback time point corresponding to each SAP in the subsegment in order to determine which SAP in the subsegment is closest to the access time point.

For example, after the media segment is determined as seg3.m4s according to the access time point being the seventh second in step 202, a segment index of seg3.m4s is acquired in step 203. The segment index describes that the media segment includes four subsegments, sub_seg0, sub_seg1, sub_seg2, and sub_seg3, and playback duration of the subsegments is respectively 0.5 second, 0.6 second, 0.4 second, and 0.5 second in order to determine that the access time point is located in the subsegment sub_seg1. sub_seg1 includes three SAPs, SAP0, SAP1, and SAP2, and time offsets of the SAPs are respectively 0.1, 0.2, and 0.4 in order to obtain, by means of computation, that actual playback time points corresponding to SAP0, SAP1, and SAP2 are the $6.6^{th}$ second, the $6.7^{th}$ second, and the $6.9^{th}$ second respectively. Further, it is determined that SAP2 is closest to the access time point, that is, the seventh second.

Certainly, the foregoing method of determining a SAP closest to the access time point is only an optional manner. For example, the method may also include after acquiring playback duration of each subsegment included in the segment index and a time offset, relative to a start location of the subsegment, of each SAP in the subsegment included in the segment index, computing actual playback time points corresponding to all SAPs, and determining, from all the SAPs, a SAP closest to the access time point. In addition, a client can select, according to a client policy and from SAPs that are before or after the access time point, a SAP closest to the access time point, which is not described in detail herein.

Step 205: Determine whether the first video frame is an independently decoded frame. If a determining result is that the first video frame is a non-independently decoded frame, perform step 206, otherwise, perform step 208 of starting decoding from the first video frame, and performing video playback if a determining result is that the first video frame is an independently decoded frame.

Determining whether the first video frame is an independently decoded frame further includes determining, according to the type of the video frame corresponding to the SAP included in the segment index, whether the first video frame is an independently decoded frame. For example, whether the first video frame is an independently decoded frame is determined according to a value of the parameter SAP_type in the example of step 203.

Step 206: Acquire, according to the frame identifier of the independently decoded frame included in the segment index, the independently decoded frame that is referenced by the first video frame.

In the example corresponding to FIG. 3 and described in step 203, the frame identifier of the independently decoded frame includes a segment identifier of the media segment in which the independently decoded frame is located and the location information of the independently decoded frame in the media segment, and the step 206 further includes acquiring the base address of the video from the MPD, forming, using the segment identifier of the media segment and the base address of the video, the acquiring address of the media segment, acquiring the media segment from the server, and then acquiring, according to the location information and from the media segment, the independently decoded frame that is referenced by the first video frame.

For example, if the frame identifier of the independently decoded frame includes a segment identifier and a frame number, a value of the segment identifier is test01.m4s, and a value of the frame number is 3, after the media segment is acquired, the third video frame is obtained by parsing the media segment according to offset address information that is of each frame and that is included in a header of a subsegment. For another example, if the frame identifier of the independently decoded frame includes a segment identifier and a storage offset address, a value of the segment identifier is test01.m4s, and a value of the storage offset address is 0×10, after the media segment is acquired, offset address information of a next frame of the video frame, that is, end address information of the video frame, is obtained by means of query according to offset address information that is of each frame and that is included in a header of a subsegment, and the video frame is obtained by parsing the offset address information. Optionally, in the step, if the first video frame and the G frame that is referenced by the first video frame are in a same media segment, and the media segment has been acquired, the media segment can be directly acquired locally.

In the example corresponding to FIG. 4 and described in step 203, the frame identifier of the independently decoded frame includes the segment identifier of the single segment in which the independently decoded frame is located and the location information of the independently decoded frame in the single segment, and the step 206 further includes locally acquiring the single segment corresponding to the segment identifier, and then acquiring, according to the location information and from the single segment, the independently decoded frame that is referenced by the first video frame. A difference from the example corresponding to FIG. 3 lies only in that, the step is implemented by locally acquiring the single segment corresponding to the segment identifier.

Step 207: Start decoding from the first video frame according to the independently decoded frame that is referenced by the first video frame, and perform video playback.

Further, the step includes successively acquiring, according to the MPD file and from the server, the media segment corresponding to the access time point and a media segment that is after the media segment corresponding to the access time point, and decoding the independently decoded frame that is referenced by the first video frame in order to decode the first video frame and a video frame that is after the first video frame, and to perform video playback from the first video frame.

In this embodiment, SAP density (including both a G frame and an S frame and a P frame that reference the G frame) is increased by extending definition of a SAP, and location information of all SAPs in the media segment and a frame identifier of a G frame that is referenced by a non-independently decoded frame in video frames corresponding to the SAPs are added to a segment index of a media segment such that a terminal can determine, according to an access time point and the segment index more accurately, a SAP closest to the access time point. Decoding and playback can start from the video frame corresponding to the SAP closest to the access time point when a type of a video frame corresponding to the SAP closest to the access time point is an independently decoded frame. A G frame that is referenced by the video frame corresponding to the SAP closest to the access time point can be found according to the frame identifier included in the segment index when a type of a video frame corresponding to the SAP closest to the access time point is a non-independently decoded frame, the video frame corresponding to the SAP closest to the access time point is decoded according to the G frame, and then playback starts from the video frame corresponding to the SAP closest to the access time point. Therefore, terminal access accuracy is improved.

Figure 6:
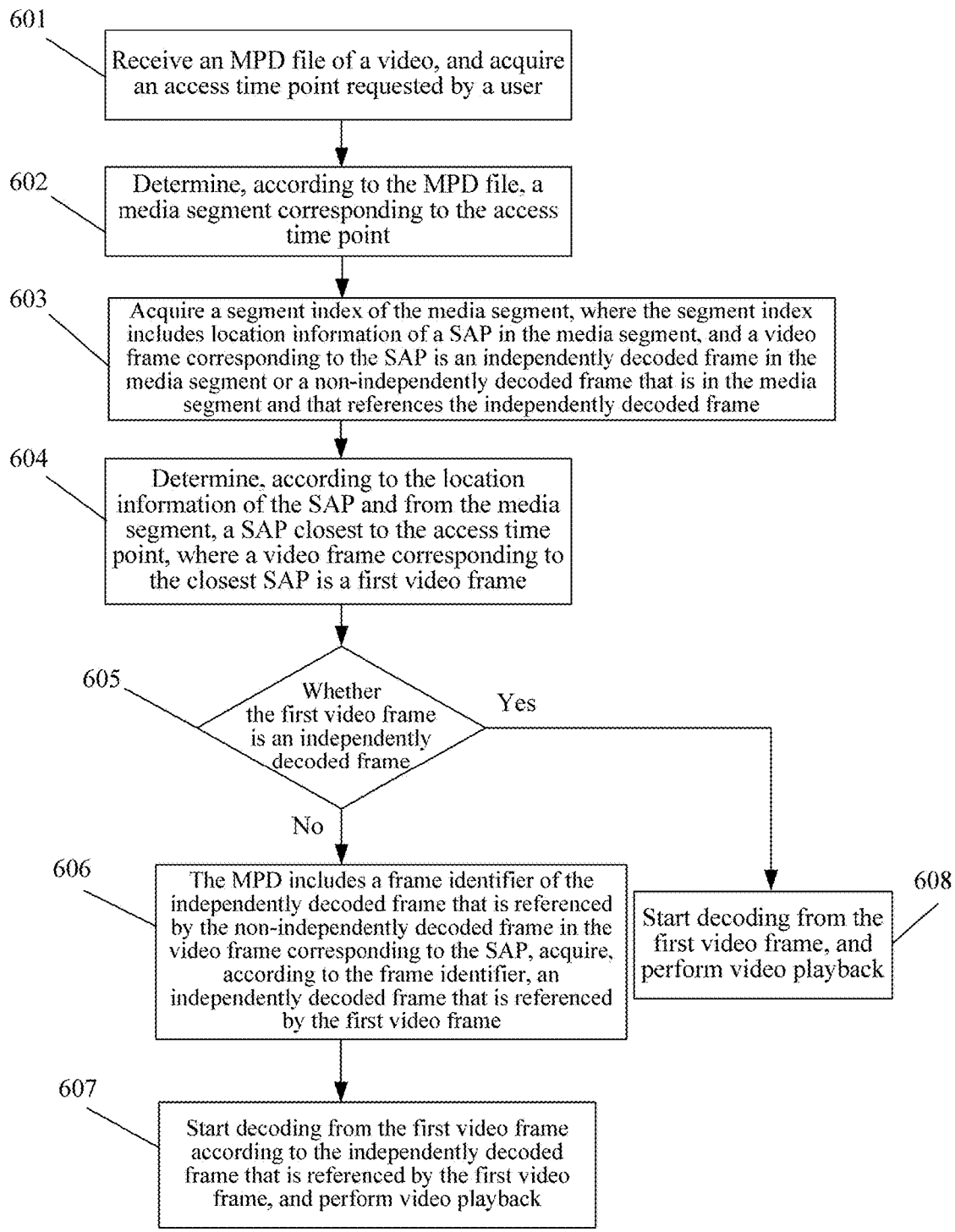
FIG. 6 is a flowchart of a network video playback method according to still another embodiment of the present disclosure.

In the video frame corresponding to the SAP, when the frame identifier of the independently decoded frame that is referenced by the non-independently decoded frame is included in an MPD file, refer to FIG. 6 for a detailed procedure for accessing a video stream by a terminal. The procedure includes the following steps.

Steps 601 and 602: Refer to steps 201 and 202 in the embodiment corresponding to FIG. 2.

Step 603: Acquire a segment index of the media segment, where the segment index includes location information of a SAP in the media segment, and a video frame corresponding to the SAP is an independently decoded frame in the media segment or a non-independently decoded frame that is in the media segment and that references the independently decoded frame.

For implementation of the step, refer to step 203 in the embodiment corresponding to FIG. 2. A difference from step 203 lies in that, the segment index in this embodiment does not include the frame identifier of the independently decoded frame that is referenced by the non-independently decoded frame in the video frame corresponding the SAP.

Figure 7:
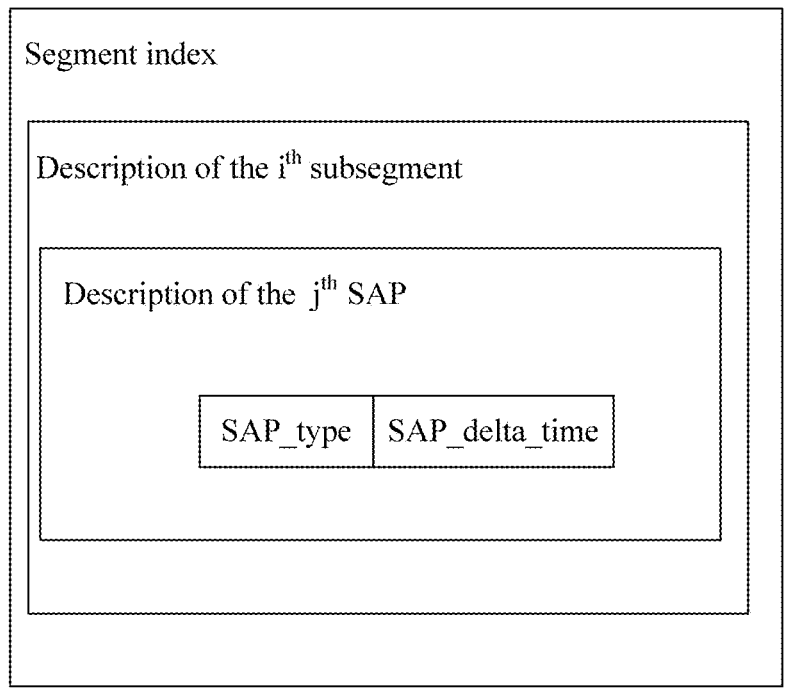
FIG. 7 shows an example of a segment index in the embodiment corresponding to FIG. 6 of the present disclosure.

FIG. 7 shows an example of a segment index. The segment index includes a description of each subsegment, where the description of any subsegment includes a description of each SAP in the subsegment, and the description of any SAP includes two parameters, SAP_type and SAP_delta_time. The parameter SAP_type is used to indicate a type of a video frame corresponding to the SAP, and the parameter SAP_delta_time is used to indicate a time offset, relative to a start location of the subsegment, of the SAP.

Step 604: Determine, according to the location information of the SAP and from the media segment, a SAP closest to the access time point, where a video frame corresponding to the SAP closest to the access time point is a first video frame.

For specific implementation of the step, refer to step 204 in the embodiment corresponding to FIG. 2.

Further, in step 604, a sequence number of the SAP closest to the access time point in an SAP list of the media segment may be also recorded.

For example, after it is computed that the SAP closest to the access time point is the third SAP in the second subsegment sub_seg1 of the media segment, further, according to a total quantity 8 of SAPs that are before the SAP closest to the access time point in all subsegments of the media segment, it is obtained that the sequence number of the SAP closest to the access time point in the SAP list of the media segment is 11.

Step 605: Determine whether the first video frame is an independently decoded frame. Perform step 606 if a determining result is that the first video frame is a non-independently decoded frame, otherwise, perform step 608 of starting decoding from the first video frame, and performing video playback if a determining result is that the first video frame is an independently decoded frame.

For specific implementation of the determining operation, refer to step 205 in the embodiment corresponding to FIG. 2.

Step 606: The MPD file received in step 601 includes a frame identifier of the independently decoded frame that is referenced by the non-independently decoded frame in the video frame corresponding to the SAP, acquire, according to the frame identifier, the independently decoded frame that is referenced by the first video frame.

The server successively encapsulates the independently decoded frame and the non-independently decoded frame of the video into the media segment, and adds the location information of the SAP in the media segment to the segment index of the media segment when encapsulating the media segment, where the location information of the SAP is the location information of an independently decoded frame in the media segment and the location information of a non-independently decoded frame that is in the media segment and that references an independently decoded frame. Optionally, the independently decoded frame of the video may also be encapsulated into a single segment, and an acquiring address of the single segment is included in the MPD file. For example, a description of initialization information in the MPD file includes a segment identifier of the single segment, and a base address and the segment identifier of the video compose the acquiring address of the single segment. Before the terminal determines, according to the MPD file, the media segment corresponding to the access time point, the terminal needs to acquire the single segment according to the acquiring address, and then locally store the single segment.

For schematic structural diagrams of the segments in these two encapsulation manners, refer to FIG. 3, FIG. 4, and detailed descriptions of FIG. 3 and FIG. 4 in step 203 in the embodiment corresponding to FIG. 2.

When the encapsulation manner shown in FIG. 3 is used, the frame identifier of the independently decoded frame included in the MPD file includes a segment identifier of the media segment in which the independently decoded frame is located and the location information of the independently decoded frame in the media segment, where the location information may be a frame number, or may be a storage offset address.

When the encapsulation manner shown in FIG. 4 is used, the frame identifier of the independently decoded frame included in the segment index includes a segment identifier of the single segment in which the independently decoded frame is located and the location information of the independently decoded frame in the single segment, where the location information may be a frame number, or may be a storage offset address.

Figure 8:
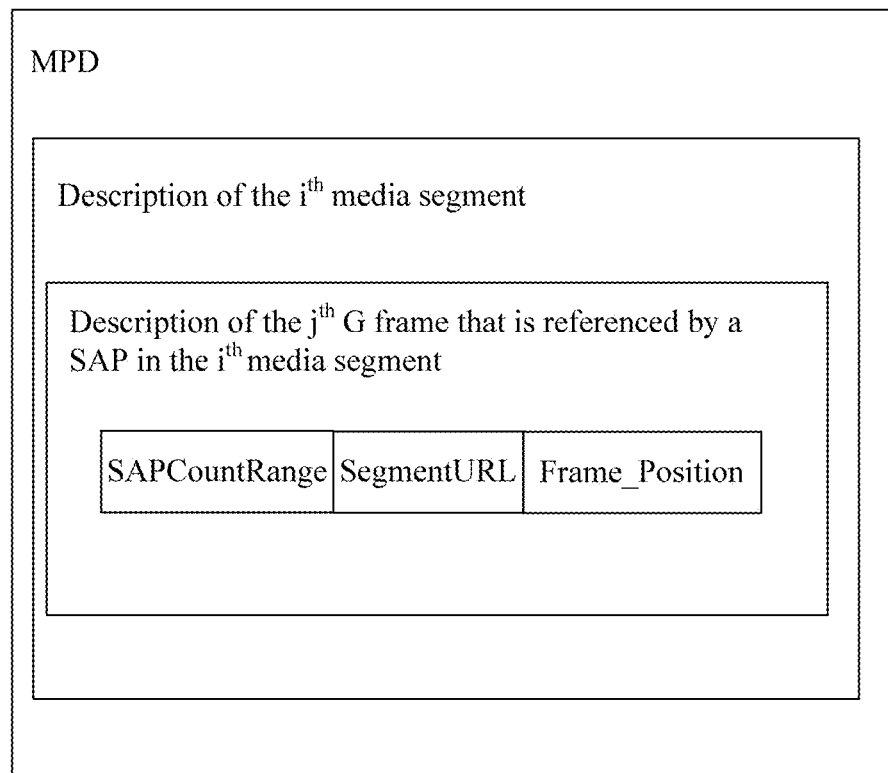
FIG. 8 shows an example of an MPD file in the embodiment corresponding to FIG. 6 of the present disclosure.

FIG. 8 shows an example of an MPD file in the two examples corresponding to FIG. 3 and FIG. 4. The MPD file includes a description of each media segment, where the description of any media segment includes a description of a G frame that is referenced by a SAP in the media segment, and the description of any referenced G frame includes three parameters, SAPCountRange, SegmentURL, and Frame_Position, which respectively indicate a sequence number range of an SAP that references the G frame, a segment identifier of a segment in which the G frame is located, and a frame number or a storage offset address of the G frame in the segment. In the example corresponding to FIG. 3, a segment in which the G frame is located refers to a media segment, and in the example corresponding to FIG. 4, a segment in which the G frame is located refers to a single segment.

For example, the parameter SAPCountRange="1,15," the parameter SegmentURL=test01.m4s, and the parameter Frame_Position refers to a frame number and Frame_Position=3, which mean that an SAP whose sequence number range is 1-15 references the G frame, the segment identifier of the segment in which the G frame is located is test01.m4s, and the frame number of the G frame in the segment is 3.

For another example, the parameter SAPCountRange="1, 15," the parameter SegmentURL=test01.m4s, and the parameter Frame_Position refers to a storage offset location and Frame_Position=0 ×10, which mean that an SAP whose sequence number range is 1-15 references the G frame, the segment identifier of the segment in which the G frame is located is test01.m4s, and the storage offset location of the G frame in the segment is 0×10.

After the frame identifier included in the MPD is acquired, the independently decoded frame that is referenced by the first video frame is acquired according to the frame identifier. For details, refer to the description of step 206 in the embodiment corresponding to FIG. 2.

In the example corresponding to FIG. 3, an existing manner of encapsulating a segment by the server does no need to be changed, and therefore, costs of changing an existing system are the lowest. In the example corresponding to FIG. 4, the server stores the independently decoded frame in the single segment, and the terminal downloads the single segment to the terminal before the terminal determines, according to the MPD file, the media segment corresponding to the access time point. This can avoid a problem of a low access speed or high overheads in the first example when the P frame or the S frame in the video frame corresponding to the SAP and the G frame that is referenced by the P frame or the S frame are not in a same media segment, the media segment in which the G frame is located needs to be acquired in real time and then parsed out, or all media segments are downloaded in advance. Therefore, a speed of acquiring the G frame is increased at the cost of minimum space overheads. However, costs of changing the existing system are higher than those in the first example, because the single segment needs to be encapsulated and the MPD file needs to be modified additionally.

Step 607: Refer to step 207 in the embodiment corresponding to FIG. 2.

In this embodiment, SAP density (including both a G frame and an S frame and a P frame that references the G frame) is increased by extending definition of an SAP, location information of all SAPs in the media segment is added to a segment index of a media segment, and a frame identifier of a G frame that is referenced by a non-independently decoded frame in video frames corresponding to the SAPs is added to an MPD such that a terminal can determine, according to an access time point and the segment index more accurately, an SAP closest to the access time point. Decoding and playback can start from the video frame corresponding to the SAP closest to the access time point when a type of a video frame corresponding to the SAP closest to the access time point is an independently decoded frame. A G frame that is referenced by the video frame corresponding to the SAP closest to the access time point can be found according to the frame identifier included in the segment index when a type of a video frame corresponding to the SAP closest to the access time point is a non-independently decoded frame, the video frame corresponding to the SAP closest to the access time point is decoded according to the G frame, and then playback starts from the video frame corresponding to the SAP closest to the access time point. Therefore, terminal access accuracy is improved.

Figure 9:
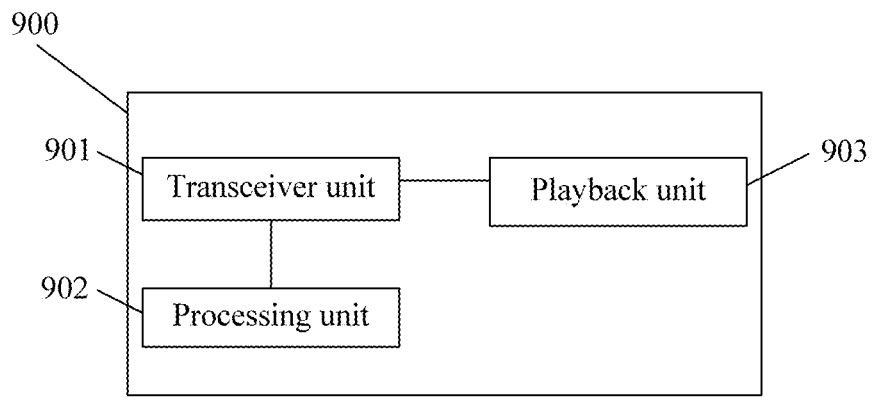
FIG. 9 is a structural diagram of a network video playback terminal according to an embodiment of the present disclosure.

An embodiment of the present disclosure provides a network video playback terminal. Referring to FIG. 9, the terminal 900 includes a transceiver unit 901, a processing unit 902, and a playback unit 903, where the transceiver unit 901 is configured to receive an MPD file of a video, and acquire an access time point requested by a user. The processing unit 902 is configured to determine, according to the MPD file, a media segment corresponding to the access time point. The transceiver unit 901 is further configured to acquire a segment index of the media segment according to the media segment determined by the processing unit 902, where the segment index includes location information of an independently decoded frame in the media segment and location information of a non-independently decoded frame that is in the media segment and that references an independently decoded frame. The processing unit 902 is further configured to determine, according to the location information and from an independently decoded frame and a non-independently decoded frame that references an independently decoded frame, a video frame closest to the access time point, and determine that the video frame closest to the access time point is a non-independently decoded frame. The transceiver unit 901 is further configured to acquire an independently decoded frame that is referenced by the video frame closest to the access time point after the processing unit 902 determines that the video frame closest to the access time point is a non-independently decoded frame, and the playback unit 903 is configured to start decoding from the video frame closest to the access time point according to the independently decoded frame that is referenced by the video frame closest to the access time point, and perform video playback.

Optionally, the processing unit 902 is further configured to determine that the video frame closest to the access time point is an independently decoded frame, and the playback unit 903 is further configured to start decoding from the video frame closest to the access time point, and perform video playback after the processing unit 902 determines that the video frame closest to the access time point is an independently decoded frame.

Optionally, the segment index includes a description of a subsegment in the media segment, and that the transceiver unit 901 acquires a segment index of the media segment, where the segment index includes location information of an independently decoded frame in the media segment and location information of a non-independently decoded frame that is in the media segment and that references an independently decoded frame further includes acquiring the segment index of the media segment, where the description of the subsegment in the media segment includes location information of an independently decoded frame in the subsegment and location information of a non-independently decoded frame that is in the subsegment and that references an independently decoded frame.

Optionally, the MPD file or the segment index further includes a frame identifier of the independently decoded frame that is referenced by the non-independently decoded frame, that the transceiver unit 901 acquires an independently decoded frame that is referenced by the video frame closest to the access time point further includes acquiring, according to the frame identifier of the independently decoded frame, the independently decoded frame that is referenced by the video frame closest to the access time point.

Optionally, the frame identifier of the independently decoded frame includes a segment identifier of the segment in which the independently decoded frame is located and the location information of the independently decoded frame in the segment, and that the transceiver unit 901 acquires an independently decoded frame that is referenced by the video frame closest to the access time point further includes acquiring, according to the segment identifier of the segment in which the independently decoded frame is located and the location information of the independently decoded frame in the segment, the independently decoded frame that is referenced by the video frame closest to the access time point.

Optionally, the segment in which the independently decoded frame is located is a single segment that includes only the independently decoded frame, and the MPD file includes an acquiring address of the single segment, and before the processing unit 902 determines, according to the MPD file, the media segment corresponding to the access time point, the transceiver unit 901 is further configured to acquire the single segment according to the acquiring address.

Optionally, the segment index further includes types of the independently decoded frame and the non-independently decoded frame, and the processing unit 902 is further configured to determine, according to the types of the independently decoded frame and the non-independently decoded frame, whether the video frame closest to the access time point is an independently decoded frame or a non-independently decoded frame.

Optionally, that the transceiver unit 901 is further configured to acquire a segment index of the media segment according to the media segment determined by the processing unit 902, where the segment index includes location information of an independently decoded frame in the media segment and location information of a non-independently decoded frame that is in the media segment and that references an independently decoded frame further includes the independently decoded frame is a background frame, and the non-independently decoded frame is a background update frame or a forward-predicted frame.

In all the embodiments of the present disclosure, the terminal may be a mobile phone, a personal computer (PC), a tablet computer, or any other network video playback device in the technical field.

Figure 10:
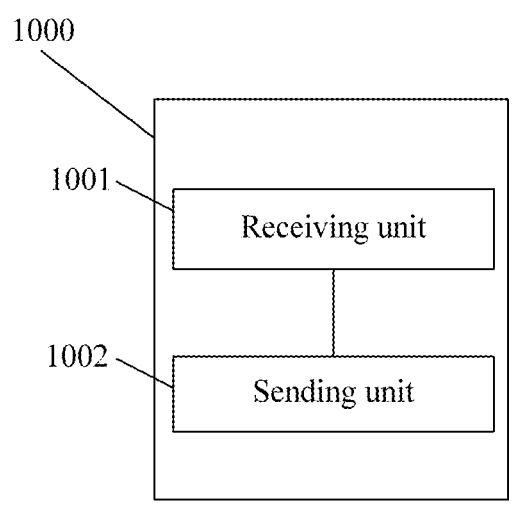
FIG. 10 is a structural diagram of a network video playback server according to an embodiment of the present disclosure.

An embodiment of the present disclosure provides a network video playback server. Referring to FIG. 10, the server 1000 includes a receiving unit 1001 configured to receive a request for acquiring a segment index of a media segment, where the request is sent by a terminal after the terminal determines the media segment corresponding to an access time point, and a sending unit 1002 configured to return the segment index to the terminal according to the request, where the segment index includes location information of an independently decoded frame in the media segment and location information of a non-independently decoded frame that is in the media segment and that references an independently decoded frame such that after the terminal determines, according to the location information of an independently decoded frame in the media segment and location information of a non-independently decoded frame that is in the media segment and that references an independently decoded frame, a video frame closest to the access time point from the independently decoded frame and the non-independently decoded frame, the terminal starts decoding from the video frame closest to the access time point, and performs video playback.

Figure 11:
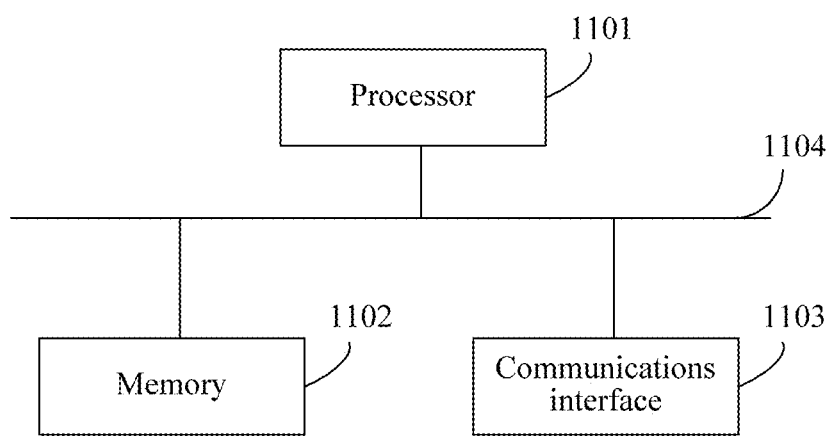
FIG. 11 is a structural diagram of a network video playback terminal based on a computer system according to an embodiment of the present disclosure.

The network video playback terminal in the embodiments of the present disclosure can be implemented based on a computer system, and all the methods shown in FIG. 1, FIG. 2, and FIG. 6 can be implemented by the network video playback terminal that is based on the computer system. FIG. 11 shows an embodiment of a network video playback terminal that is implemented based on a computer system. The network video playback terminal in this embodiment may include a processor 1101, a memory 1102, and a communications interface 1103.

The communications interface 1103 is configured to communicate with a server. Messages exchanged between the network video playback terminal and the server are all sent and received through the communications interface 1103. Further, the communications interface 1103 is configured to receive an MPD file that is of a video and that is returned by the server, and acquire an access time point requested by a user. The memory 1102 is configured to store a program instruction. After the communications interface 1103 receives the MPD file of the video and acquires the access time point requested by the user, the processor 1101 is configured to invoke the program instruction stored in the memory 1102, to perform the following operations: determining, according to the MPD file, a media segment corresponding to the access time point, acquiring a segment index of the media segment, where the segment index includes location information of an independently decoded frame in the media segment and location information of a non-independently decoded frame that is in the media segment and that references an independently decoded frame, determining, according to the location information of an independently decoded frame in the media segment and location information of a non-independently decoded frame that is in the media segment and that references an independently decoded frame, a video frame closest to the access time point from the independently decoded frame and the non-independently decoded frame that references an independently decoded frame, determining that the video frame closest to the access time point is a non-independently decoded frame, and acquiring an independently decoded frame that is referenced by the video frame closest to the access time point, and starting decoding from the video frame closest to the access time point according to the independently decoded frame that is referenced by the video frame closest to the access time point, and performing video playback.

The processor 1101 may be a central processing unit (CPU), an application-specific integrated circuit (ASIC), or the like. The network video playback terminal in this embodiment may include a bus 1104. The processor 1101, the memory 1102, and the communications interface 1103 may be connected and communicate with each other using the bus 1104. The memory 1102 may include a random access memory (RAM), a read-only memory (ROM), a magnetic disk, or an entity with a storage function.

The processor 1101 may be further configured to perform steps, related to the network video playback terminal, described in FIG. 1, FIG. 2 and FIG. 6 in the method embodiments, and details are not described again in this embodiment of the present disclosure.

The foregoing descriptions are merely exemplary implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A network video playback method implemented by a network video playback terminal, comprising:
   receiving, by a receiver of the network video playback terminal, a media presentation description (MPD) file of a video;
   acquiring, by a processor of the network video playback terminal, an access time point requested by a user;
   determining, by the processor of the network video playback terminal, a media segment corresponding to the access time point based on the MPD file;
   acquiring, by the processor of the network video playback terminal, a segment index of the media segment, wherein the segment index comprises location information of an independently decoded frame in the media segment, location information of a non-independently decoded frame, wherein the non-independently decoded frame is in the media segment and references the independently decoded frame, and a frame identifier of the independently decoded frame is referenced by the non-independently decoded frame;

determining, by the processor of the network video playback terminal, a video frame closest to the access time point based on the segment index;

if the video frame closest to the access time point is the non-independently decoded frame, starting, by the processor of the network video playback terminal, decoding from the video frame closest to the access time point based on the independently decoded frame;

if the video frame closest to the access time point is the independently decoded frame, starting, by the processor of the network video playback terminal, decoding from the video frame closest to the access time point; and performing video playback in response to decoding from the video frame closest to the access time point.

2. The method according to claim 1, wherein the segment index comprises a description of a subsegment in the media segment, and wherein the description of the subsegment in the media segment comprises location information of an independently decoded frame in the subsegment and location information of a non-independently decoded frame in the subsegment and references the independently decoded frame in the subsegment.

3. The method according to claim 1, wherein the method further comprises acquiring, by the processor of the network video playback terminal, the independently decoded frame based on the frame identifier of the independently decoded frame.

4. The method according to claim 3, wherein the frame identifier of the independently decoded frame comprises a segment identifier of the media segment in which the independently decoded frame is located and the location information of the independently decoded frame.

5. The method according to claim 4, wherein the media segment in which the independently decoded frame is located is a single segment, wherein the media segment in which the independently decoded frame comprises only the independently decoded frame, wherein the method further comprises acquiring, by the processor of the network video playback terminal, an address of the single segment, and wherein before determining the media segment corresponding to the access time point, the method further comprises acquiring, by the processor of the network video playback terminal, the single segment according to the address of the single segment.

6. The method according to claim 1, wherein the segment index further comprises types of the independently decoded frame and the non-independently decoded frame, and wherein the method further comprises determining, by the processor of the network video playback terminal, whether the video frame closest to the access time point is the independently decoded frame or the non-independently decoded frame based on the types of the independently decoded frame and the non-independently decoded frame.

7. The method according to claim 1, wherein the independently decoded frame is a background frame, and wherein the non-independently decoded frame is a background update frame.

8. The method according to claim 1, wherein the independently decoded frame is a background frame, and wherein the non-independently decoded frame is a forward-predicted frame.

9. A network video playback method implemented by a network video playback system comprising a network video playback server and a terminal, comprising:

acquiring, by a processor of the terminal, an access time point requested by a user;

receiving, by a receiver of the network video playback server, a request for acquiring a segment index of a media segment of a media presentation description (MDP) file, wherein the request is sent by the terminal after the terminal determines the media segment corresponding to the access time point;

returning, by a transmitter of the network video playback server, the segment index to the terminal, wherein the segment index comprises location information of an independently decoded frame in the media segment, location information of a non-independently decoded frame, wherein the non-independently decoded frame is in the media segment and references the independently decoded frame, and a frame identifier of the independently decoded frame is referenced by the non-independently decoded frame, and wherein the segment index is used to determine a video frame closest to the access time point from the independently decoded frame and the non-independently decoded frame and decoding from the video frame closest to the access time point;

determining, by the processor of the terminal, a video frame closest to the access time point based on the segment index;

if the video frame closest to the access time point is the non-independently decoded frame, starting, by the processor of the terminal, decoding from the video frame closest to the access time point based on the independently decoded frame;

if the video frame closest to the access time point is the independently decoded frame, starting, by the processor of the terminal, decoding from the video frame closest to the access time point; and performing, by the processor of the terminal, video playback in response to decoding from the video frame closest to the access time point.

10. A network video playback terminal, comprising:

a memory; and a processor coupled to the memory and configured to:
  receive a media presentation description (MPD) file of a video;
  acquire an access time point requested by a user;
  determine a media segment corresponding to the access time point according to the MPD file;
  acquire a segment index of the media segment, wherein the segment index comprises location information of an independently decoded frame in the media segment, location information of a non-independently decoded frame, wherein the non-independently decoded frame is in the media segment and references the independently decoded frame, and a frame identifier of the independently decoded frame is referenced by the non-independently decoded frame;
  determine a video frame closest to the access time point from the independently decoded frame and the non-independently decoded frame based on the segment index;
  if the video frame closest to the access time point is the non-independently decoded frame, start decoding from the video frame closest to the access time point based on the independently decoded frame;

if the video frame closest to the access time point is the independently decoded frame, start decoding from the video frame closest to the access time point; and performing video playback in response to decoding from the video frame closest to the access time point.

11. The network video playback terminal according to claim 10, wherein the segment index comprises a description of a subsegment in the media segment, and wherein the description of the subsegment in the media segment comprises location information of an independently decoded frame in the subsegment and location information of a non-independently decoded frame in the subsegment and references the independently decoded frame in the subsegment.

12. The network video playback terminal according to claim 10, wherein the processor is further configured to acquire the independently decoded frame, wherein the independently decoded frame is referenced by the video frame closest to the access time point based on the frame identifier of the independently decoded frame.

13. The network video playback terminal according to claim 12, wherein the frame identifier of the independently decoded frame comprises a segment identifier of the media segment in which the independently decoded frame is located and the location information of the independently decoded frame, and wherein the processor is further configured to acquire the independently decoded frame, wherein the independently decoded frame is referenced by the video frame closest to the access time point based on the frame identifier of the independently decoded frame.

14. The network video playback terminal according to claim 13, wherein the media segment in which the independently decoded frame is located is a single segment, wherein the media segment in which the independently decoded frame is located comprises only the independently decoded frame, wherein the processor is further configured to acquire the single segment according to the address of the single segment.

15. The network video playback terminal according to claim 10, wherein the segment index further comprises types of the independently decoded frame and the non-independently decoded frame, and wherein the processor is further configured to determine whether the video frame closest to the access time point is the independently decoded frame or the non-independently decoded frame based on the types of the independently decoded frame and the non-independently decoded frame.

16. The network video playback terminal according to claim 10, wherein the independently decoded frame is a background frame, and wherein the non-independently decoded frame is a background update frame.

17. The network video playback terminal according to claim 10, wherein the independently decoded frame is a background frame, and wherein the non-independently decoded frame is a forward-predicted frame.

18. A network video playback system, comprising:
a network video playback server comprising:
   a first processor;
   a first memory coupled to the processor and configured to store a computer program, wherein the computer program comprises instructions that when executed by the first processor, cause the first processor to:
      receive a request for acquiring a segment index of a media segment of a media presentation description (MPD) file, wherein the request is sent by a terminal after the terminal determines the media segment corresponding to an access time point; and
      return the segment index to the terminal, wherein the segment index comprises location information of an independently decoded frame in the media segment, location information of a non-independently decoded frame, wherein the non-independently decoded frame is in the media segment and references the independently decoded frame, and a frame identifier of the independently decoded frame is referenced by the non-independently decoded frame, and wherein the segment index is used to determine a video frame closest to the access time point from the independently decoded frame and the non-independently decoded frame and decoding from the video frame closest to the access time point; and
a terminal comprising:
   a second processor;
   a second memory coupled to the processor and configured to store a computer program, wherein the computer program comprises instructions that when executed by the second processor, cause the second processor to:
      acquire the access time point requested by a user;
      determine a video frame closest to the access time point based on the segment index;
      if the video frame closest to the access time point is the non-independently decoded frame, start decoding from the video frame closest to the access time point based on the independently decoded frame;
      if the video frame closest to the access time point is the independently decoded frame, start decoding from the video frame closest to the access time point; and
      perform video playback in response to decoding from the video frame closest to the access time point.

* * * * *